United States Patent
Trezza

(10) Patent No.: US 7,027,203 B2
(45) Date of Patent: Apr. 11, 2006

(54) COMBINATION MICROMACHINE AND OPTICAL DEVICE ARRAY

(75) Inventor: John Trezza, Nashua, NH (US)

(73) Assignee: Xanoptix Inc., Merrimack, NH (US)

( * ) Notice: Subject to any disclaimer, the term of this patent is extended or adjusted under 35 U.S.C. 154(b) by 0 days.

(21) Appl. No.: 10/391,431

(22) Filed: Mar. 18, 2003

(65) Prior Publication Data

US 2004/0036949 A1 Feb. 26, 2004

Related U.S. Application Data

(60) Provisional application No. 60/366,040, filed on Mar. 19, 2002.

(51) Int. Cl.
*G02B 26/00* (2006.01)
(52) U.S. Cl. ............... 359/291; 359/290; 359/224; 359/292
(58) Field of Classification Search ........ 359/290, 359/291, 871, 223, 224, 850, 237
See application file for complete search history.

(56) References Cited

U.S. PATENT DOCUMENTS

| | | | |
|---|---|---|---|
| 5,761,350 A | 6/1998 | Koh | 385/14 |
| 6,137,941 A * | 10/2000 | Robinson | 385/140 |
| 6,275,320 B1 | 8/2001 | Dhuler et al. | 359/237 |
| 6,457,830 B1 * | 10/2002 | Choi | 353/33 |
| 6,531,767 B1 * | 3/2003 | Shrauger | 257/678 |
| 6,545,385 B1 * | 4/2003 | Miller et al. | 310/309 |
| 6,549,692 B1 * | 4/2003 | Harel et al. | 385/18 |
| 6,563,106 B1 * | 5/2003 | Bowers et al. | 250/216 |
| 6,704,476 B1 * | 3/2004 | Ford et al. | 385/18 |
| 2001/0022598 A1 * | 9/2001 | Silverbrook | 347/54 |
| 2002/0054424 A1 * | 5/2002 | Miles | 359/291 |
| 2003/0122206 A1 * | 7/2003 | Bhattarai et al. | 257/415 |
| 2004/0174757 A1 * | 9/2004 | Garverick et al. | 365/200 |

* cited by examiner

*Primary Examiner*—Ricky Mack
*Assistant Examiner*—Brandi N. Thomas
(74) *Attorney, Agent, or Firm*—Morgan & Finnegan LLP

(57) ABSTRACT

A unit is made up of an electronic integrated circuit, a MEMS device, and an active optical device, electrically coupled to the electronic integrated circuit and located between the electronic integrated circuit and the MEMS device. Tthe MEMS device is electrically coupled to the electronic integrated circuit and positioned to affect the behavior of light, relative to the active optical device, based upon the position of an element in the MEMS device as controlled by the electronic integrated circuit.

9 Claims, 8 Drawing Sheets

FIG. 6
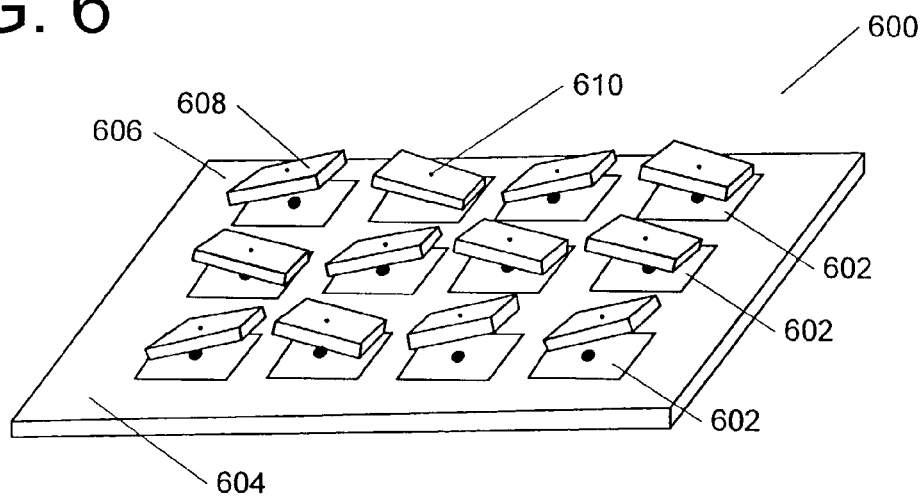
FIG. 5
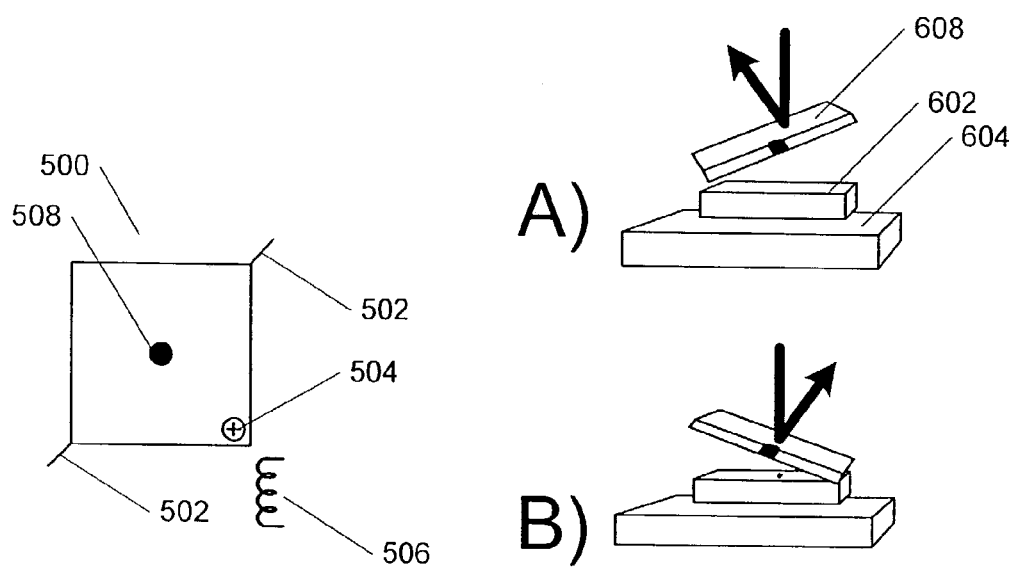
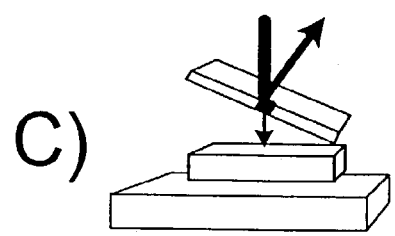
FIG. 7

FIG. 8
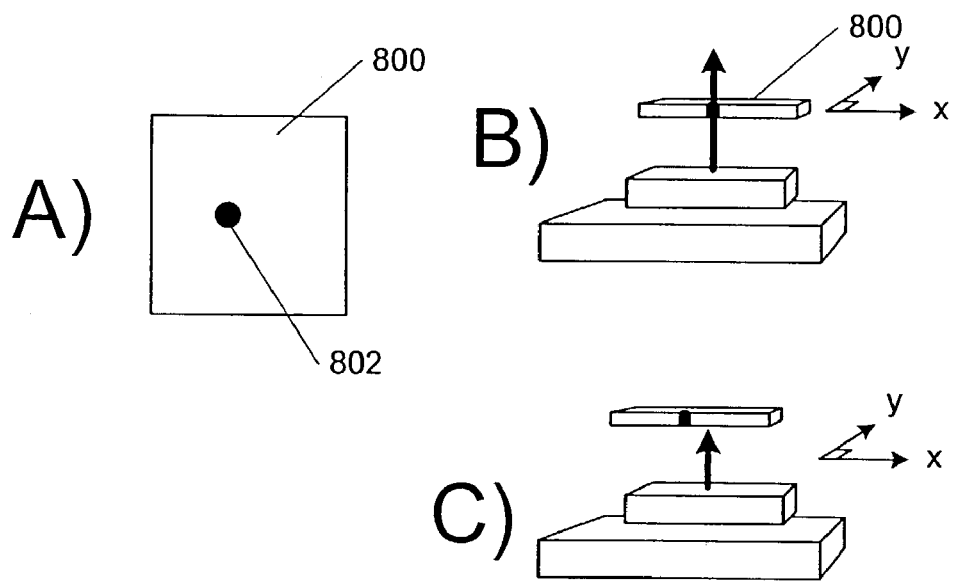
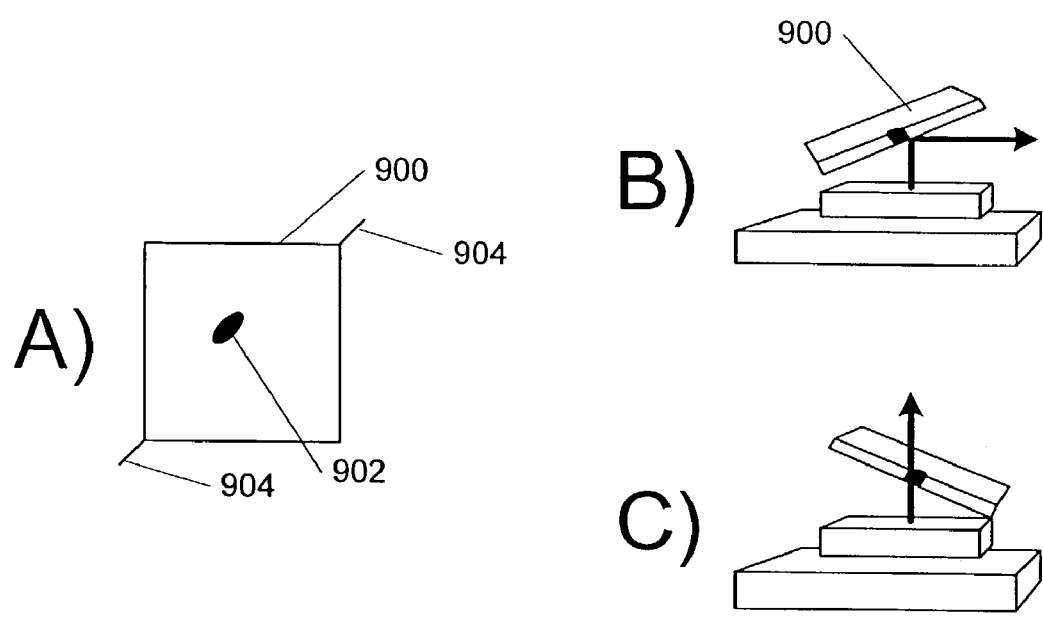
FIG. 9

FIG. 13
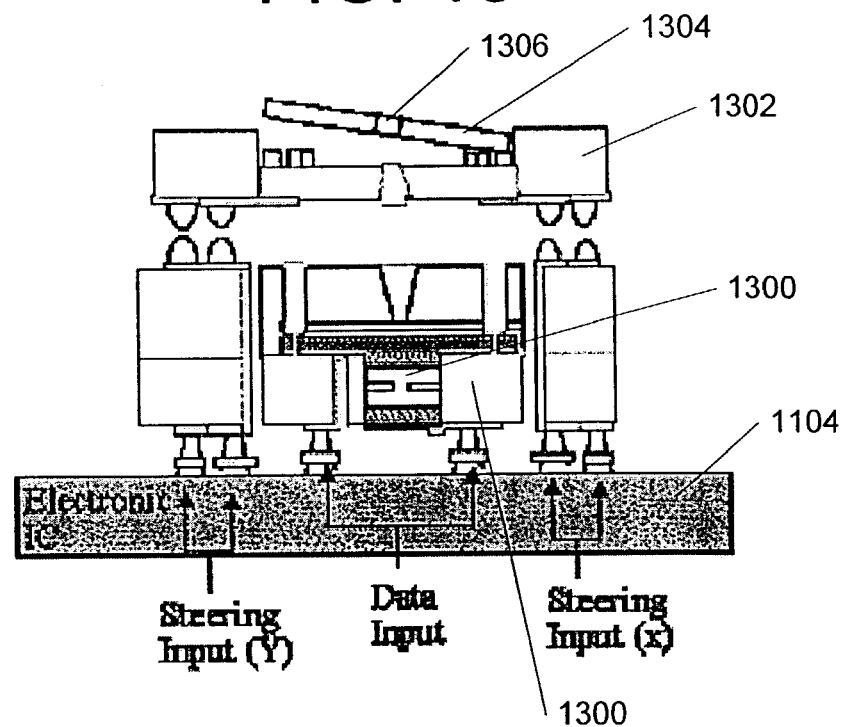
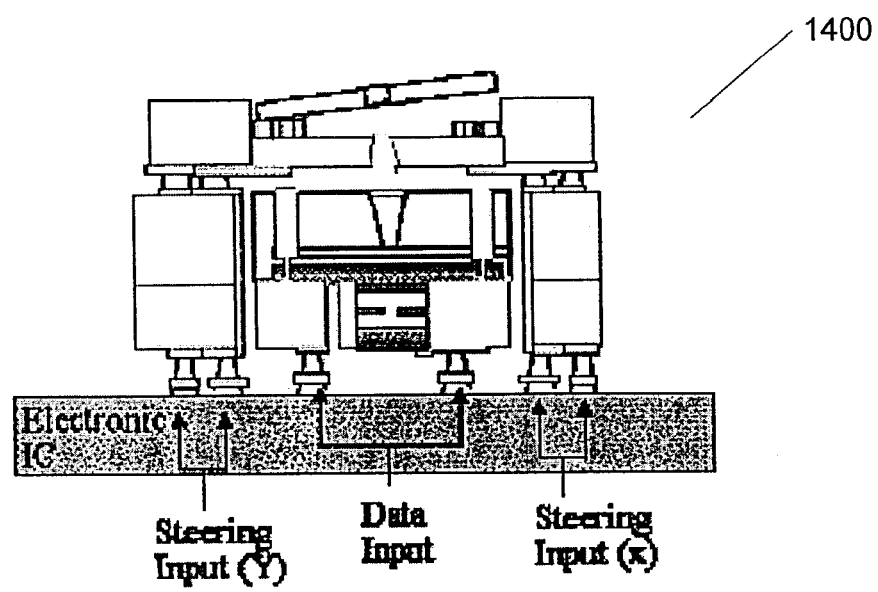
FIG. 14

COMBINATION MICROMACHINE AND OPTICAL DEVICE ARRAY

CROSS REFERENCE TO RELATED APPLICATIONS

This application claims priority under 35 USC 119(e)(1) of U.S. Provisional Patent Application Ser. No. 60/366,040 filed Mar. 19, 2002.

FIELD OF THE INVENTION

This invention relates to micromachines and, more particularly, micromachines used in combination with optical devices such as lasers or photodetectors.

BACKGROUND OF THE INVENTION

Microelectromechanical devices (MEMS) consist of tiny "micromachines" which use electricity to move very small structures. In the optics world, MEMS have been most widely used to attempt to make optical cross-connects that use a series of micromirrors to steer light from one fiber to another fiber.

FIG. 1 and FIG. 2 show a MEMS optical cross-connect 100 of the prior art. A group of fibers 102, 104, 106, 108 are arranged in an aligned manner so that light leaving one of the fibers 108 will traverse an air gap 110 and enter another fiber 104 aligned with the first fiber 108. Similarly, light from a different fiber 106 exiting the fiber 106 will enter a different fiber 102 aligned with it. A MEMS micromirror 112 that is moveable into and out of the air gap 110 is also provided. The movement of the micromirror 112 into and out of the air gap 110 affects where light exiting a fiber into the air gap 110 goes and thus, can be used to steer light exiting a fiber to different fibers depending upon the micromirror's 112 position. For example, when the micromirror 112 is not in the air gap 110, i.e. in the position shown in FIG. 1, the light travels straight through the air gap 110. However, when the micromirror 112 is moved into the air gap 110, as is shown in FIG. 2, the light will be steered to an adjacent fiber. In other words, light leaving one of the fibers 106 when the micromirror 112 is in the position of FIG. 1 will enter the fiber 102 directly across from it. Whereas, with the miocromirror 112 in the position of FIG. 2, light leaving the same fiber 106 will be steered to a different fiber 104.

Presently however, to the extent such micromachine cross-connects even exist, their use is limited and they are configured as stand alone elements.

Thus, there is a need in the art for more versatile MEMS devices that can be more easily used in conjunction with active optical devices.

SUMMARY OF THE INVENTION

We have conceived of MEMS devices and arrangements that make it possible to combine electronics, active optical devices and micromachine based passive optical devices in a way that makes them more versatile and more closely coupled with active optical devices.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 5 is a tilting MEMS micromirror suitable for use in connection with various implementations of the invention;

FIG. 6 is a simplified representative example of another variant unit according to the teachings of the invention;

FIG. 7A shows one device from the example of FIG. 6 in one micromirror 608 position;

FIG. 7B, shows the micromirror 608 of FIG. 7A after it has been pivoted about its pins to one position;

FIG. 7C is the device of FIG. 7A after it has been pivoted about its pins to another position;

FIG. 8A is a further example of one passive device for use with a single active device in accordance with the teachings of the present invention;

FIG. 8B shows the device of FIG. 8A in one position;

FIG. 8C shows the device of FIG. 8A in another position;

FIG. 9A is a further example of one passive device for use with a single active device in accordance with the teachings of the present invention;

FIG. 9B shows the device of FIG. 9A in one position;

FIG. 9C shows the device of FIG. 9A in another position;

FIG. 13 is a cutaway side view of a pivoting MEMS micromirror that can also be integrated with the active optical device and IC of FIG. 11;

FIG. 14 shows the final unit of FIG. 13 after the MEMS micromirror has been integrated with the IC;

DETAILED DESCRIPTION

This invention relates to the integration of arrays micromachines (movable lenses and mirrors) on top of integrated arrays of photonic devices (lasers, detectors, and/or modulators) that are themselves closely integrated with, typically on top of, electronic chips.

There are two main classes of optical devices: active and passive. Active optical devices are devices which, through the use of external power sources and materials, change a behavior of light. Examples of active optical devices are lasers, detectors, and modulators. Passive optical devices are devices in which no external power is used to modify light behavior. Instead the interaction of the light with the material of the device itself is used to effect a change in the light's behavior. Examples of passive optical devices are lenses, mirrors and waveguides.

While passive optical devices do not use power to change the behavior of the light, by moving a passive optical element relative, the way light interacts with it can be changed. For example, if a mirror is moved by tilting, the effect resulting from light's interaction with the mirror will be different, because it may be reflected at a different angle. If the mirror is flexible, changing the mirror from a flat plane to a curved one can cause the way light interacts with the mirror to change.

Similarly, the interaction of light with a particular lens will be different, depending upon where on the lens the light strikes.

As a result, by making passive optical MEMS devices, where the passive device is moveable, and closely integrating those devices with active optical devices, highly versatile and beneficial results can be achieved.

Figure 1:
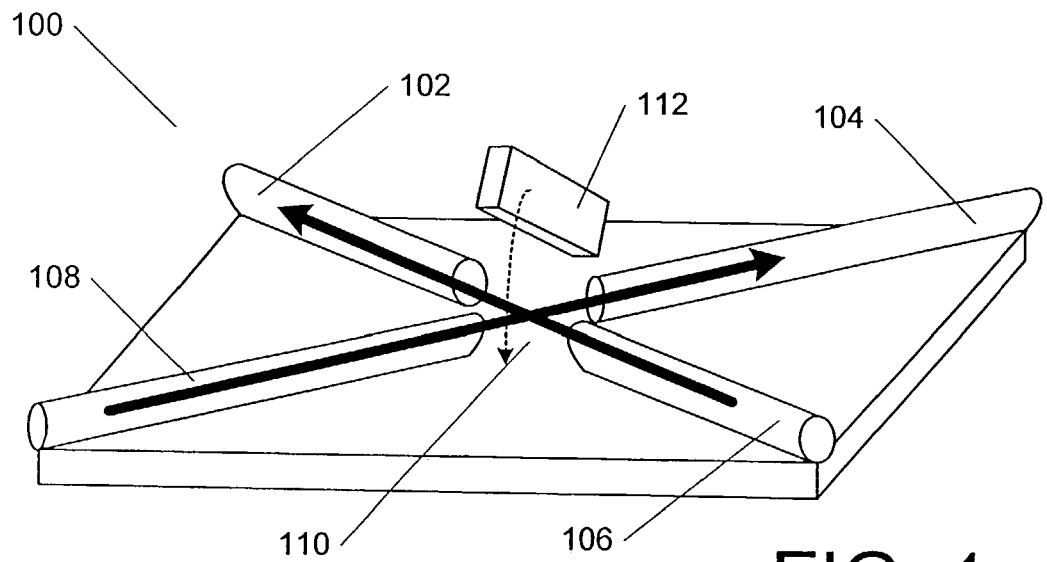
FIG. 1 is a MEMS optical cross-connect of the prior art with its mirror in one position.
Figure 2:
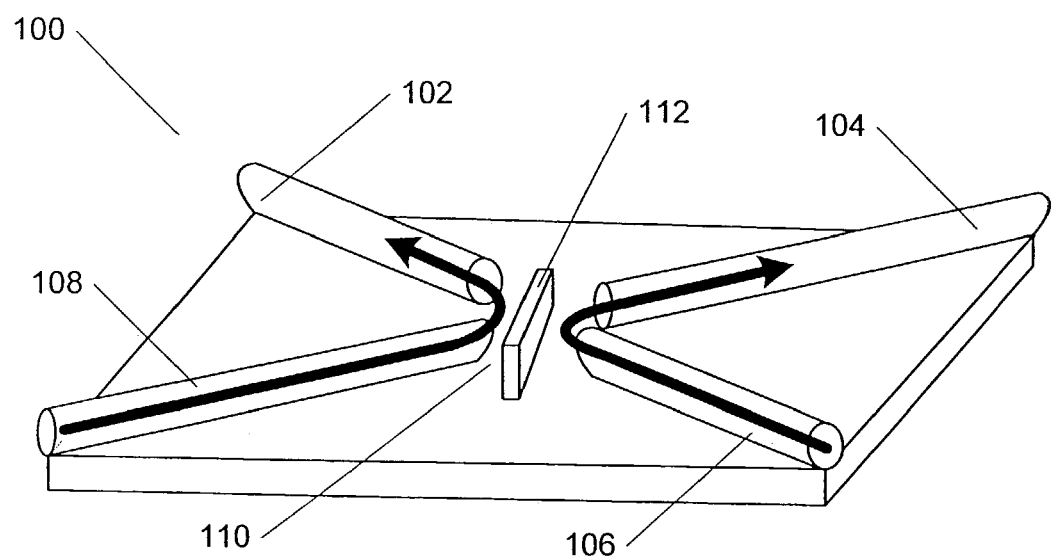
FIG. 2 is a MEMS optical cross-connect of the prior art with its mirror in an alternative position.
Figure 3:
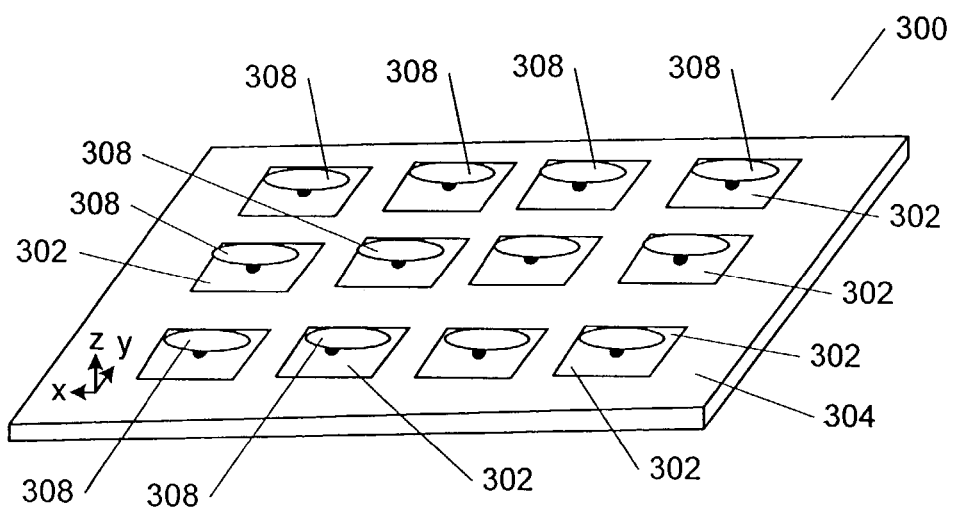
FIG. 3 is a simplified representative example of one variant unit according to the teachings of the invention.

In accordance with the invention, depending upon the particular implementation, the passive optical device can be made so that it is moveable: in a plane essentially perpendicular to the direction light is emitted/received by an active optical device, in a tilting fashion relative to the direction light is emitted/received by an active optical device, along the direction light is emitted/received by an active optical device, or some combination thereof FIG. 3 is a simplified representative example of one variant unit 300 according to the teachings of the invention. In this example, the unit 300 is made up of multiple active optical devices 302, in this case lasers, integrated with an electronic integrated circuit (IC) chip 304 to form an optoelectronic chip. An array of lenses 306 is located above the active optical devices 302. Each lens 308 is individually moveable, in this case in the x-y plane (i.e. a plane essentially perpendicular to the direction the laser emits). By moving the lens, along the x-axis, the y-axis or both axes, the optical beams from the laser can be "steered". This makes it possible to couple the light from a single laser to two or more different fibers.

Figure 4:
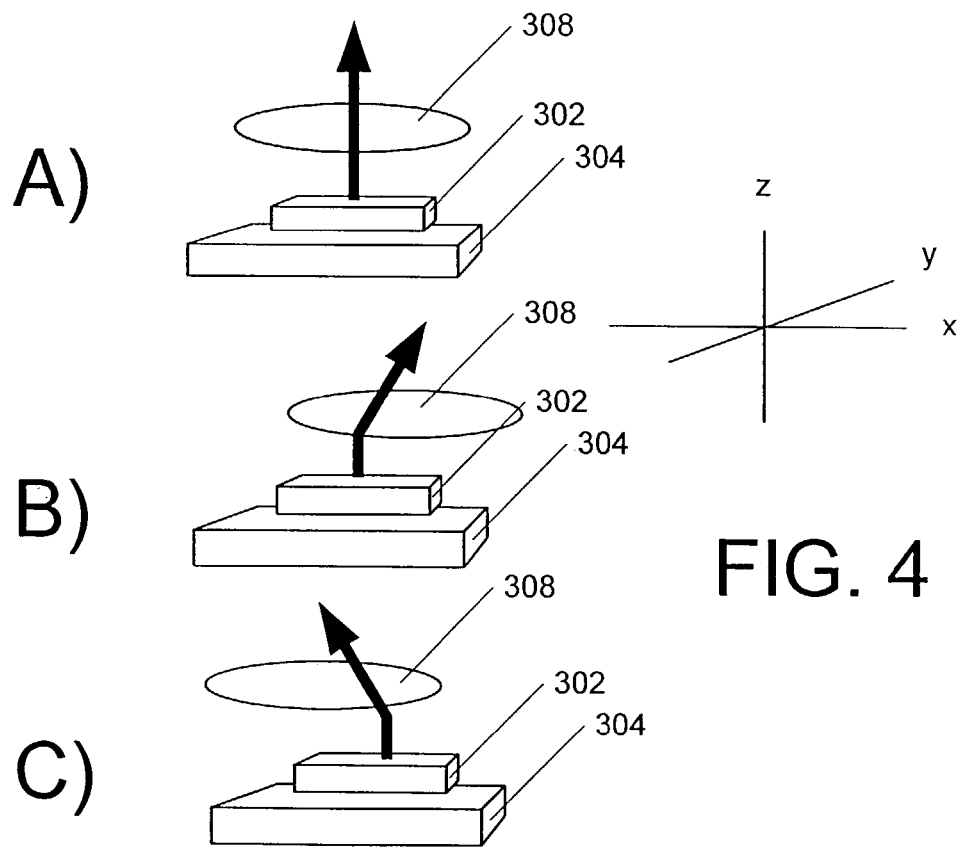
FIG. 4A shows a single device from the example of FIG. 3 in a neutral position.
FIG. 4B shows the lens of FIG. 4A after it has been moved along the y-axis.
FIG. 4C is the device of FIG. 4A after it has been moved along the x-axis.

FIG. 4A shows a single device from the example of FIG. 3 in a neutral position. In this position, the emitted light travels along the z-axis.

FIG. 4B shows the lens of FIG. 4A after it has been moved along the y-axis to a position such that the emitted light from the laser is steered along the y-z plane.

FIG. 4C is the device of FIG. 4A after it has been moved along the x-axis to a position such that the emitted light from the laser is steered along the x-z plane.

Of course, by using a combination of movement in both the x and y direction, the beam can be steered towards a different location between the directions of FIG. 4B and FIG. 4C. Similarly, movement in the minus x or minus y directions will produce analogous results.

FIG. 5 is a tilting MEMS micromirror 500 suitable for use in connection with various implementations of the invention. The micromirror 500 has two pins 502 at opposite corners of the micromirror 500 (the micromirror in this case being square in shape, although rectangles, ovals, circles, etc. could be used in different implementations). A portion 504 of the micromirror 500 contains a charge (electrical or magnetic) so that the application of a micro-electric field, for example, from an electrically or electro-statically charged plate, pad or coil 506 will cause the portion 504 to be attracted to or repelled by the field, thereby pivoting the micromirror 500 about the pins 502. Optionally, as will be described in greater detail below, a hole 508 can be included in the micromirror 500 so that, depending upon the size of the hole 508 and its placement on the mirror, different effects can be achieved.

FIG. 6 is a simplified representative example of another variant unit 600 according to the teachings of the invention. In this example, the unit 600 is made up of multiple active optical devices 602, in this case detectors, integrated with an electronic integrated circuit (IC) chip 604 to form an optoelectronic chip. An array 606 of pivotable micromirrors 608 is located above the active optical devices 602. Each micromirror 608 is individually tilt-able about pins (not shown). By pivoting a micromirror 608, about the pins, optical beams can be steered by reflection in different directions. In addition, an optional hole 610 placed in the mirror allows light to reach the detector 602 located below a micromirror 608. Depending upon the size and placement of the hole 610, a small amount of light can strike the detector while the bulk is reflected, most or all of the light can reach a detector 602, or all of the light can be reflected. Advantageously, this allows some variants to operate so that a micromirror 608 can steer external light while the detector 602 below detects some of the light and switches the mirror based upon information in the light stream.

FIG. 7A shows one device from the example of FIG. 6 in one micromirror 608 position. In this position, the incident light is reflected towards the left.

FIG. 7B, shows the micromirror 608 of FIG. 7A after it has been pivoted about its pins such that the incident light is reflected towards the right.

FIG. 7C is the device of FIG. 7A after it has been pivoted such that some of the incident light passes through the hole 610 to the detector 602 below while the remainder of the incident light is reflected.

FIG. 8A is a further example of one passive device 800 for use with a single active device in accordance with the teachings of the present invention. In this example, the passive 800 is optically opaque and has a hole 802 that is offset from its center. The passive device 800 is designed to be moved in the x-y plane, similar to the lenses of FIG. 3 or FIG. 4. By placing this device 800 over a laser, the laser can be left in a continuous emitting or "on" state and, depending upon the position of the device 800, the emitted beam will either pass through the hole 802 (FIG. 8B) or be blocked by the device 800 (FIG. 8C). In this manner, the device can be used, for example, as a switch.

Depending upon the particular implementation, it should be understood that the device 800 can be a reflective material or a material that absorbs light.

FIG. 9A is another example of a passive device 900 for use with a single active device in accordance with the teachings of the present invention. In this example, the passive 900 is optically opaque and has a hole 902 that is offset from its center. The passive device 900 is designed to pivot about pins 904, similar to the micromirrors of FIG. 5, FIG. 6 or FIG. 7. By placing this device 800 over a laser, the laser can be left in a continuous emitting or "on" state and, depending upon the position of the device 900, the emitted beam will either pass through the hole 902 (FIG. 9B) or, if the material making up the device 900 is reflective, the emitted beam can be directed to another location, for example a fiber, another passive device, or a nearby detector. If the material is light absorbing, the emitted beam will be blocked by the device 800. In this manner, the device can be used both to steer a beam and as a switch. Moreover, if the material is reflective in one area while being light absorbing in another, further combinations can be achieved.

Figure 10:
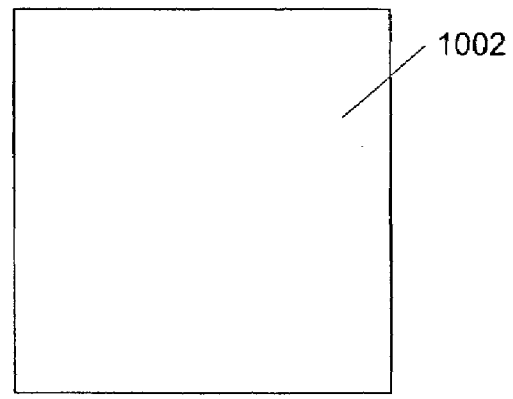
FIG. 10 shows, in simplified overview, the process of making an array in accordance with the invention.
Figure 10:
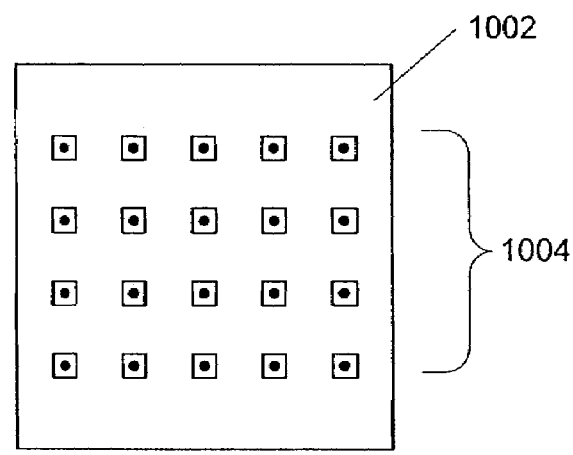
Figure 10:
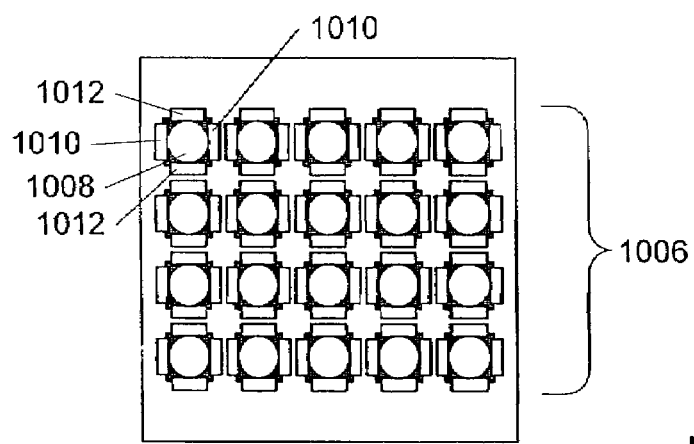

FIG. 10 shows, in simplified overview, the process of making an array in accordance with the invention, looking perpendicular to the plane of the devices. First an IC 1002 has the array of active devices 1004 attached to it. Depending upon the particular implementation, this can be accomplished using techniques well known in the art or techniques such as shown and described in commonly assigned U.S. patent application Ser. Nos. 09/896,189, 09/896,665, 09/897,160, 09/896,983, 09/897,158, all filed Jun. 29, 2001, the entire disclosures of which are incorporated herein by reference. Then, the array of MEMS devices 1006 are attached over the active devices. In alternative variants, the optical devices 1004 can be integrated with the MEMS devices 1006 before they are integrated with the IC 1002.

As shown, the MEMS devices are lenses 1008 that are each moveable in the x-y plane by fields generated along the x axis by a pair of elements 1010 that push-pull the lens 1008 along the x-axis and a pair of elements 1012 that push-pull the lens 1008 along the y-axis.

Figure 11:
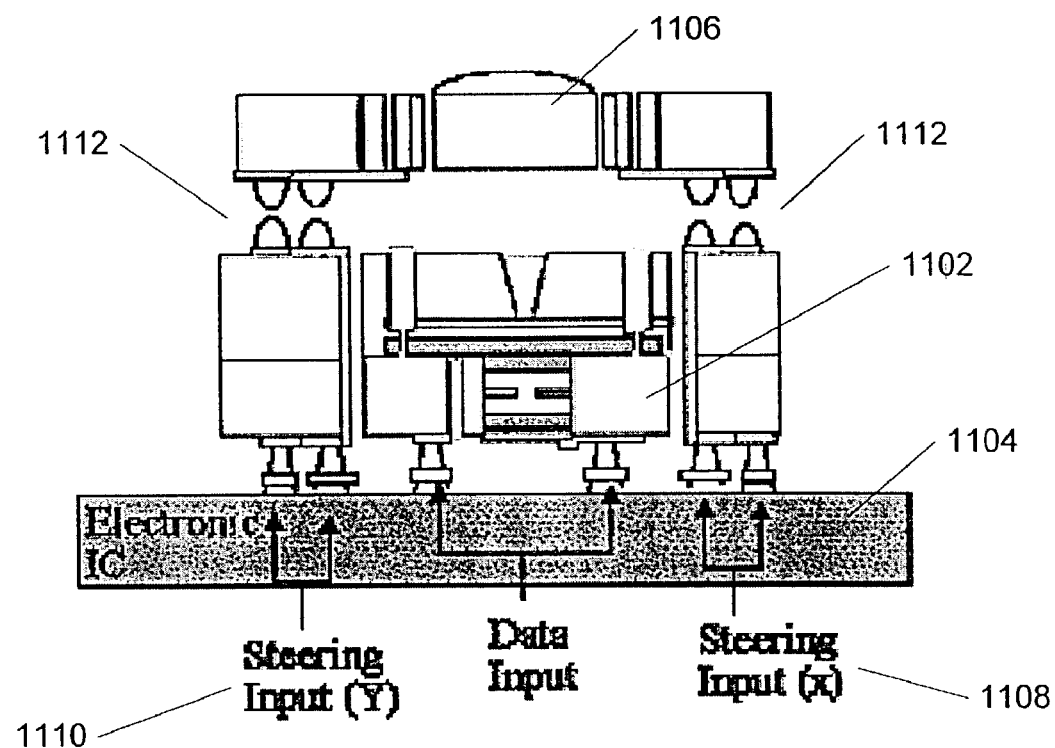
FIG. 11 is a cutaway side view of a plane moveable lens based unit implementing the teachings of the invention.
Figure 12:
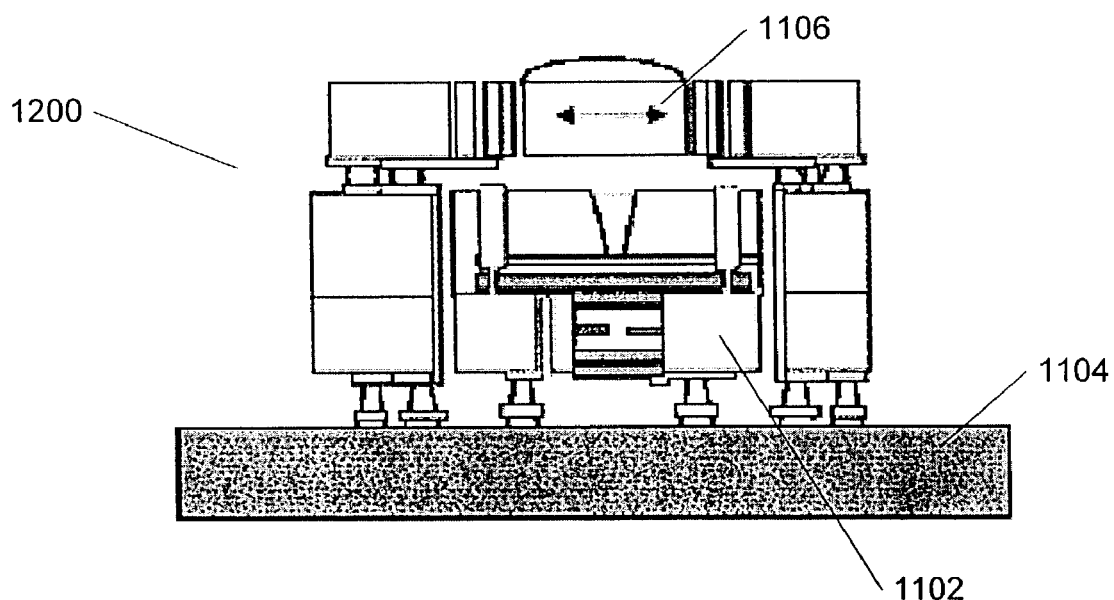
FIG. 12 shows the final unit of FIG. 11 after the MEMS lens has been integrated with the IC 1104.

FIG. 11 is a cutaway side view of a plane moveable lens based unit implementing the teachings of the invention. An active optical device 1102, in this case a laser, is mounted onto an electronic IC 1104. The IC 1104 includes circuitry to control both the data output by the laser, and also the position of the lens 1106 using steering input X 1108 and steering input Y. The MEMS lens 1106 is placed over the active device 1102 and will be connected to the steering inputs 1108, 1110 of the IC 1104 via connection pads 1112. FIG. 12 shows the final unit 1200 after the MEMS lens 1106 has been integrated with the IC 1104.

FIG. 13 is a cutaway side view of a pivoting MEMS micromirror 1302 that can also be integrated with an active optical device 1300, in this case a photodetector 1300, and the IC 1104 of FIG. 11. As shown, the micromirror 1302 includes a mirror element 1304 that has a hole 1306 in it so that light can be steered by pivoting the mirror while a small amount of incident light will pass through to the photodetector 1300, irrespective of the position of the mirror element 1304.

FIG. 14 shows the final unit 1400 after the MEMS micromirror 1302 has been integrated with the IC 1104.

Figure 15:
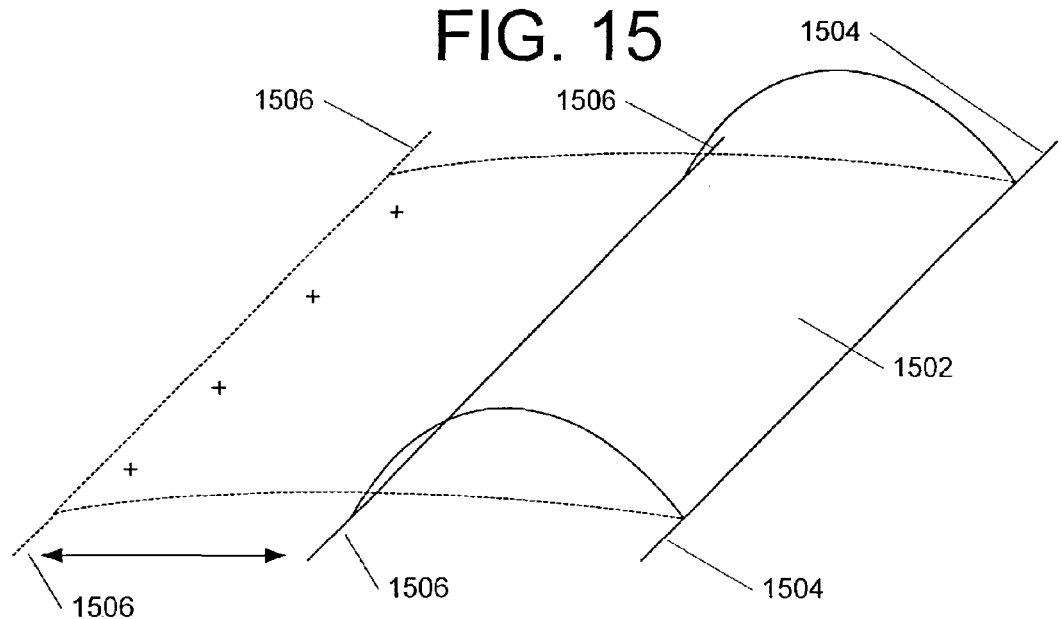
FIG. 15 shows yet another example of a MEMS device that can be integrated with an active optical device in accordance with the teachings of the invention.

FIG. 15 shows yet another example of a MEMS device that can be integrated with an active optical device in accordance with the teachings of the invention. In the example of FIG. 15, a flexible reflective element 1500 is constrained on one side 1502, for example by fixed pins 1504. A pair of slideably moveable pins 1506 allow the curvature of the element 1500 to be changed, for example from nearly flat to highly curved, thereby deflecting incident light on the element 1500 differently based upon the angle of the incident light, the curvature of the element 1500, and location the light strikes the element 1500.

Figure 16:
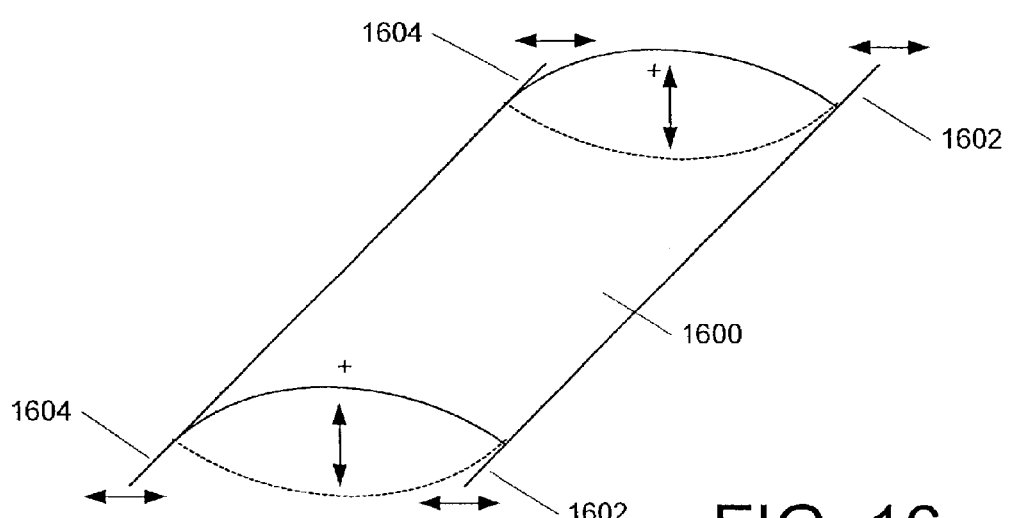
FIG. 16 shows still another example of a MEMS device that can be integrated with an active optical device in accordance with the teachings of the invention.

FIG. 16 shows still another example of a MEMS device that can be integrated with an active optical device in accordance with the teachings of the invention. In the example of FIG. 16, a flexible reflective element 1600 has a pair of slideably moveable pins 1602, 1604 on either side of the element 1600 that allows the curvature of the element 1600 to be changed, for example from concave to convex, thereby deflecting incident light on the element 1600 differently based upon the angle of the incident light, the curvature of the element 1600, and location the light strikes the element 1600.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention and others are equivalent.

What is claimed is:

1. A unit comprising:
    an electronic integrated circuit;
    a MEMS device; and
    an active optical device, electrically integrated with the electronic integrated circuit and located between the electronic integrated circuit and the MEMS device,
        the MEMS device being electrically integrated with the electronic integrated circuit and positioned to affect the behavior of light, relative to the active optical device, based upon the position of an element in the MEMS device as controlled by the electronic integrated circuit.

2. The unit of claim 1 wherein the element comprises a lens.

3. The unit of claim 1 wherein the element comprises a moving micromirror having a first surface, a second surface opposite the first surface, the micromirror further having a hole extending from the first surface to the second surface.

4. The unit of claim 3 wherein the micromirror is configured for movement in a plane defined by the first surface.

5. The unit of claim 3 wherein the micromirror is configured for tilting movement.

6. The unit of claim 1 wherein the active optical device is one of multiple active optical devices and the element is one of multiple elements, and wherein each of the elements has a corresponding active optical device.

7. The unit of claim 1 wherein the element is a flexible reflective element.

8. The unit of claim 7 wherein the flexible reflective element comprises a fixed portion and a moveable portion, the moveable portion being located so that movement thereof changes a curvature of the flexible reflective element.

9. The unit of claim 7 wherein the flexible reflective element comprises a pair of movable portions configured so that a curvature of the flexible reflective element
    a) increases when the individual moveable portions in the pair are brought closer to each other, and
    b) decreases when the individual moveable portions in the pair are moved apart from each other.

* * * * *